(12) United States Patent
Redert et al.

(10) Patent No.: US 7,692,646 B2
(45) Date of Patent: Apr. 6, 2010

(54) METHOD OF AND SCALING UNIT FOR SCALING A THREE-DIMENSIONAL MODEL

(75) Inventors: Peter-Andre Redert, Eindhoven (NL); Alexander Henricus Waltherus Van Eeuwijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 961 days.

(21) Appl. No.: 10/596,456

(22) PCT Filed: Dec. 6, 2004

(86) PCT No.: PCT/IB2004/052675

§ 371 (c)(1),
(2), (4) Date: Jun. 14, 2006

(87) PCT Pub. No.: WO2005/062257

PCT Pub. Date: Jul. 7, 2005

(65) Prior Publication Data

US 2009/0009536 A1  Jan. 8, 2009

(30) Foreign Application Priority Data

Dec. 19, 2003  (EP) .................................. 03104818

(51) Int. Cl.
*G06T 15/00* (2006.01)

(52) U.S. Cl. ...................... 345/419; 345/424; 345/427; 382/292; 382/293; 701/3

(58) Field of Classification Search ................. 345/419, 345/424, 427; 382/292, 293; 701/3
See application file for complete search history.

(56) References Cited

U.S. PATENT DOCUMENTS

| 6,760,027 B2 * | 7/2004 | Endo et al. .................. 345/427 |
| 6,862,501 B2 * | 3/2005 | He ................................. 701/3 |
| 6,947,611 B2 * | 9/2005 | Kawakami et al. .......... 382/293 |
| 7,268,781 B2 * | 9/2007 | Nomura et al. ............. 345/427 |
| 7,471,291 B2 * | 12/2008 | Kaufman et al. ............ 345/424 |

OTHER PUBLICATIONS

Foley et al. "Computer Graphics, Principles and Practice", 1996, pp. 229-291.*

* cited by examiner

*Primary Examiner*—Phu Nguyen (57) ABSTRACT

A method of scaling a three-dimensional input model 100 in a three-dimensional input space into a three-dimensional output model 200 which fits in a predetermined three-dimensional output space 104 is disclosed. The scaling is such that a first input surface 106 in the three-dimensional input space, having a first distance to a viewpoint, is projected to a first output surface 110 in the predetermined three-dimensional output space by applying a first scaling factor and whereby a second input surface 108 in the three-dimensional input space, having a second distance to the viewpoint, which is smaller than the first distance, is projected to a second output surface 112 in the predetermined three-dimensional space, by applying a second scaling factor which is larger than the first scaling factor.

8 Claims, 5 Drawing Sheets

METHOD OF AND SCALING UNIT FOR SCALING A THREE-DIMENSIONAL MODEL

The invention relates to a method of scaling a three-dimensional input model in a three-dimensional input space into a three-dimensional output model which fits in a predetermined three-dimensional output space.

The invention further relates to a scaling unit for scaling a three-dimensional input model in a three-dimensional input space into a three-dimensional output model which fits in a predetermined three-dimensional output space.

The invention further relates to an image display apparatus comprising:
  receiving means for receiving a signal representing a three-dimensional model;
  a scaling unit as described above; and
  rendering means for rendering a three-dimensional image on basis of the three-dimensional output model.

The invention further each relates to a computer-readable medium having a computer program stored thereon to be loaded into a computer arrangement, the computer program comprising instructions to scale a three-dimensional input model in a three-dimensional input space into a three-dimensional output model which fits in a predetermined three-dimensional output space.

The probability that the size of a three-dimensional scene does not match with the display capabilities of an image display device, on which the scene is to be displayed, is high, e.g. the dimensions of a three-dimensional scene comprising a house are much bigger than typical dimensions of a display device. Hence, a scaling operation is required. Other reasons why scaling might be required is to adapt the geometry of the three-dimensional model representing the three-dimensional scene to a transmission channel or to adapt the three-dimensional model to the viewer's preferences.

Linear scaling operations on a three-dimensional model representing a three-dimensional scene are well known. Scaling of depth information is in principle performed by means of a linear adaptation of the depth information related to the depth range of the output space. Alternatively, information which exceeds the limits of the display capabilities are clipped.

A disadvantage of depth adaptation or scaling is that it might result in reduction of depth impression. Especially the linear depth scaling might be disadvantageous for the depth impression of the scaled three-dimensional model because the available depth range of display devices is often relatively small.

It is an object of the invention to provide a method of the kind described in the opening paragraph which results in a scaled three-dimensional output model with a relatively strong three-dimensional impression.

This object of the invention is achieved in that a first input surface in the three-dimensional input space, having a first distance to a viewpoint, is projected to a first output surface in the predetermined three-dimensional output space by applying a first scaling factor and whereby a second input surface in the three-dimensional input space, having a second distance to the viewpoint, which is smaller than the first distance, is projected to a second output surface in the predetermined three-dimensional space, by applying a second scaling factor which is larger than the first scaling factor. In other words, the applied scaling factor is not constant but is related to the distance between an input surface and a viewpoint. A smaller distance means a larger scaling factor. An advantage of the method according to the invention is that the three-dimensional input model is adapted, i.e. reshaped, such that the depth impression is at least maintained or even enhanced. Notice that with a linear three-dimensional scaling, the depth impression is reduced if the depth range of the predetermined three-dimensional output space is much smaller than the depth of the three-dimensional input space. With the method according to the invention this reduction is prevented. Optionally the depth impression is even enhanced.

In an embodiment of the method according to the invention, a first input data point of the three-dimensional input model, being located at the first input surface is projected to a first output data point of the three-dimensional output model, being located at the first output surface by means of a perspective projection relative to the viewpoint, and a second input data point of the three-dimensional input model, being located at the second input surface is projected to a second output data point of the three-dimensional output model, being located at the first output surface by means of a perspective projection relative to the viewpoint. In other words, the input data points are projected to respective data output points on basis of a single viewpoint. An advantage of this embodiment of the method according to the invention, is that the original depth impression of the input three-dimensional model is maintained. That means that the original depth impression and the depth impression of the output three-dimensional model are substantially mutually equal.

In another embodiment of the method according to the invention, a first input data point of the three-dimensional input model, being located at the first input surface is projected to a first output data point of the three-dimensional output model, being located at the first output surface by means of a perspective projection relative to the viewpoint, and a second input data point of the three-dimensional input model, being located at the second input surface is projected to a second output data point of the three-dimensional output model, being located at the first output surface by means of a perspective projection relative to a further viewpoint. In other words, the input data points are projected to respective data output points on basis of multiple viewpoints. An advantage of this embodiment of the method according to the invention, is that the original depth impression of the input three-dimensional model is enhanced. That means that the depth impression of the output three-dimensional model is even higher than the original depth impression of the input three-dimensional model.

It is a further object of the invention to provide a scaling unit of the kind described in the opening paragraph which is arranged to provide a scaled three-dimensional output model with a relatively strong three-dimensional impression.

This object of the invention is achieved in that the scaling unit comprises computing means for computing coordinates of output data points of the three-dimensional output model corresponding to respective input data points of the three-dimensional input model, whereby a first one of the input data points which is located at a first input surface in the three-dimensional input space, having a first distance to a viewpoint, is projected to a first one of the output data points which is located at a first output surface in the predetermined three-dimensional output space by applying a first scaling factor and whereby a second one of the input data points which is located at a second input surface in the three-dimensional input space, having a second distance to the viewpoint, which is smaller than the first distance, is projected to a second one of the output data points which is located at a second output surface in the predetermined three-dimensional space, by applying a second scaling factor which is larger than the first scaling factor.

It is a further object of the invention to provide an image processing apparatus of the kind described in the opening paragraph which is arranged to provide a scaled three-dimensional output model with a relatively strong three-dimensional impression.

This object of the invention is achieved in that the scaling unit comprises computing means for computing coordinates of output data points of the three-dimensional output model corresponding to respective input data points of the three-dimensional input model, whereby a first one of the input data points which is located at a first input surface in the three-dimensional input space, having a first distance to a viewpoint, is projected to a first one of the output data points which is located at a first output surface in the predetermined three-dimensional output space by applying a first scaling factor and whereby a second one of the input data points which is located at a second input surface in the three-dimensional input space, having a second distance to the viewpoint, which is smaller than the first distance, is projected to a second one of the output data points which is located at a second output surface in the predetermined three-dimensional space, by applying a second scaling factor which is larger than the first scaling factor.

It is a further object of the invention to provide a computer-readable medium having stored thereon a computer program of the kind described in the opening paragraph which results in a scaled three-dimensional output model with a relatively strong three-dimensional impression.

This object of the invention is achieved in the computer program, after being loaded in a computer arrangement comprising processing means and a memory, provides said processing means with the capability to compute coordinates of output data points of the three-dimensional output model corresponding to respective input data points of the three-dimensional input model, whereby a first one of the input data points which is located at a first input surface in the three-dimensional input space, having a first distance to a viewpoint, is projected to a first one of the output data points which is located at a first output surface in the predetermined three-dimensional output space by applying a first scaling factor and whereby a second one of the input data points which is located at a second input surface in the three-dimensional input space, having a second distance to the viewpoint, which is smaller than the first distance, is projected to a second one of the output data points which is located at a second output surface in the predetermined three-dimensional space, by applying a second scaling factor which is larger than the first scaling factor.

Modifications of the scaling unit and variations thereof may correspond to modifications and variations thereof of the image processing apparatus, the method and the computer program product, being described.

These and other aspects of the method, of the scaling unit, of the image processing apparatus, and of the computer program product according to the invention will become apparent from and will be elucidated with respect to the implementations and embodiments described hereinafter and with reference to the accompanying drawings, wherein.

There are several types of models for the storage of three-dimensional information, i.e. a three-dimensional model:

Wireframes, e.g. as specified for VRML. These models comprise a structure of lines and faces.

Volumetric data-structures or voxel maps (Voxel means volume element). These volumetric data-structures comprise a three-dimensional array of elements. Each element has three dimensions and represents a value of a property. E.g. CT (Computer tomography) data is stored as a volumetric data-structure in which each element corresponds to a respective Hounsfield value (unit to express the amount of X-ray absorption).

Two-dimensional image with depth map, e.g. a two-dimensional image with RGBZ values. This means that each pixel comprises three color component values and a depth value. The three color component values also represent a luminance value.

Image based models, e.g. stereo image pairs or multiview images. These types of images are also called light fields.

Conversions of data represented by one type of three-dimensional model into another three-dimensional model is possible. E.g. data represented with a wireframe or a two-dimensional image with depth map can be converted by means of rendering into data represented with a volumetric data-structure or image based model.

The amount of depth which can be realized with a three-dimensional display device depends on its type. With a volumetric display device the amount of depth is fully determined by the dimensions of the display device. Stereo displays with e.g. glasses have a soft limit for the amount of depth which depends on the observer. Observers might become fatigued if the amount of depth is too much caused by a "conflict" between lens accommodation and mutual eye convergence. Autostereoscopic display devices, e.g. based on an LCD with a lenticular screen for multiple views, have a theoretical maximum depth-range which is determined by the amount of views.

Figure 1:
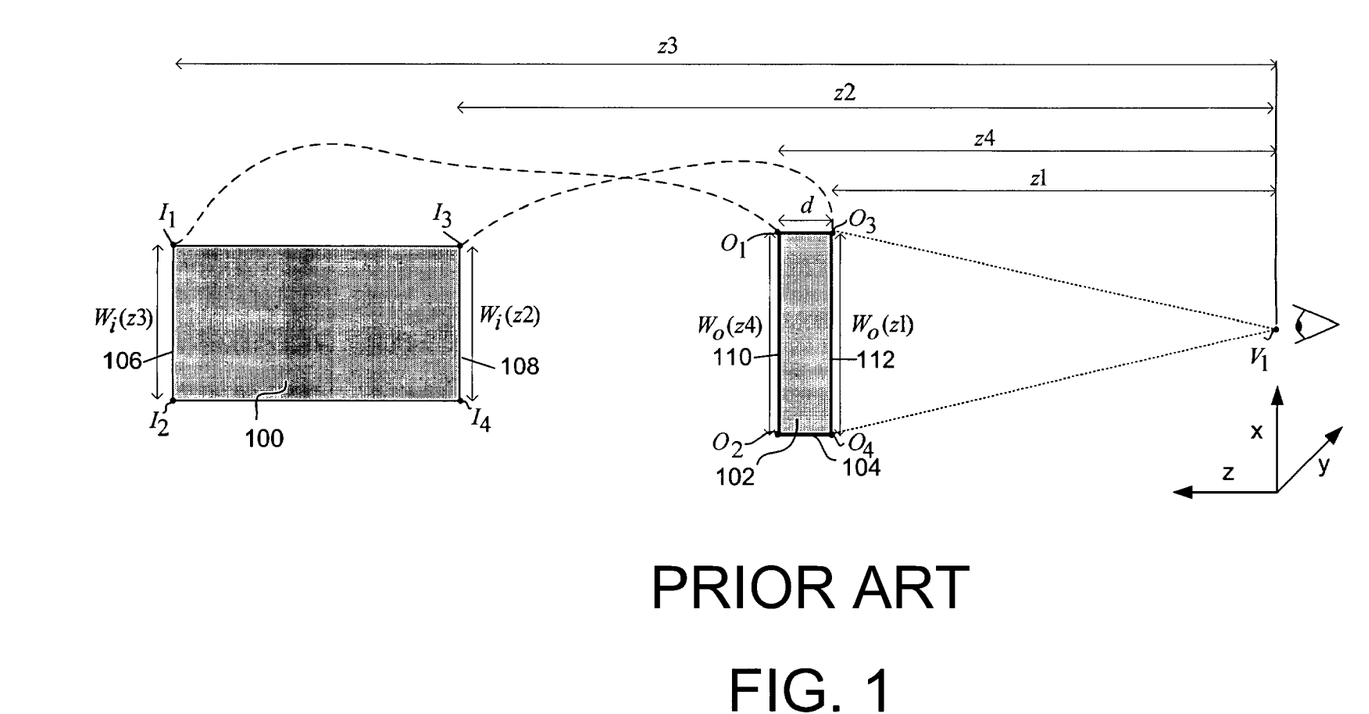
FIG. 1 schematically shows a method of scaling according to the prior art.

FIG. 1 schematically shows a method of linear scaling according to the prior art. FIG. 1 shows a three-dimensional input model 100 and a linear scaled three-dimensional output model 102 which fits in a predetermined three-dimensional output space 104, e.g. corresponding to the viewing range of a three-dimensional display device. The scaling means that each of the input data points $I_1$, $I_2$, $I_3$ and $I_4$ is transformed to a respective one of the output data points $O_1$, $O_2$, $O_3$ and $O_4$. E.g. in FIG. 1 is depicted that input data point $I_1$, which is located on the first input surface 106 at the border of the three-dimensional input model 100, is mapped to output data point $O_1$, which is located on the first output surface 110 at the border of the predetermined three-dimensional output space 104. In FIG. 1 is also depicted that input data point $I_3$, which is located at the second input surface 108 at an other border of the three-dimensional input model 100, is mapped to output data point $O_3$, which is located at the second output surface 112 at the other border of the predetermined three-dimensional output space 104. Both the three-dimensional input model 100 and the three-dimensional output model 102 have a block shape. E.g. the width $W_i(z3)$ of a first side, located at the first input surface 106 (z=z3) of the three-dimensional input model 100 is equal to the width $W_i(z2)$ of a second side, located at the second input surface 108 (z=z2) of the three-dimensional input model 100 and the width $W_o(z4)$ of a first side (z=z4), located at the first output surface 110 of the three-dimensional output model 102 is equal to the width $W_o(z1)$ of a second side ($z=z1$), located at the second output surface 112 of the three-dimensional output model 102.

Figure 2A:
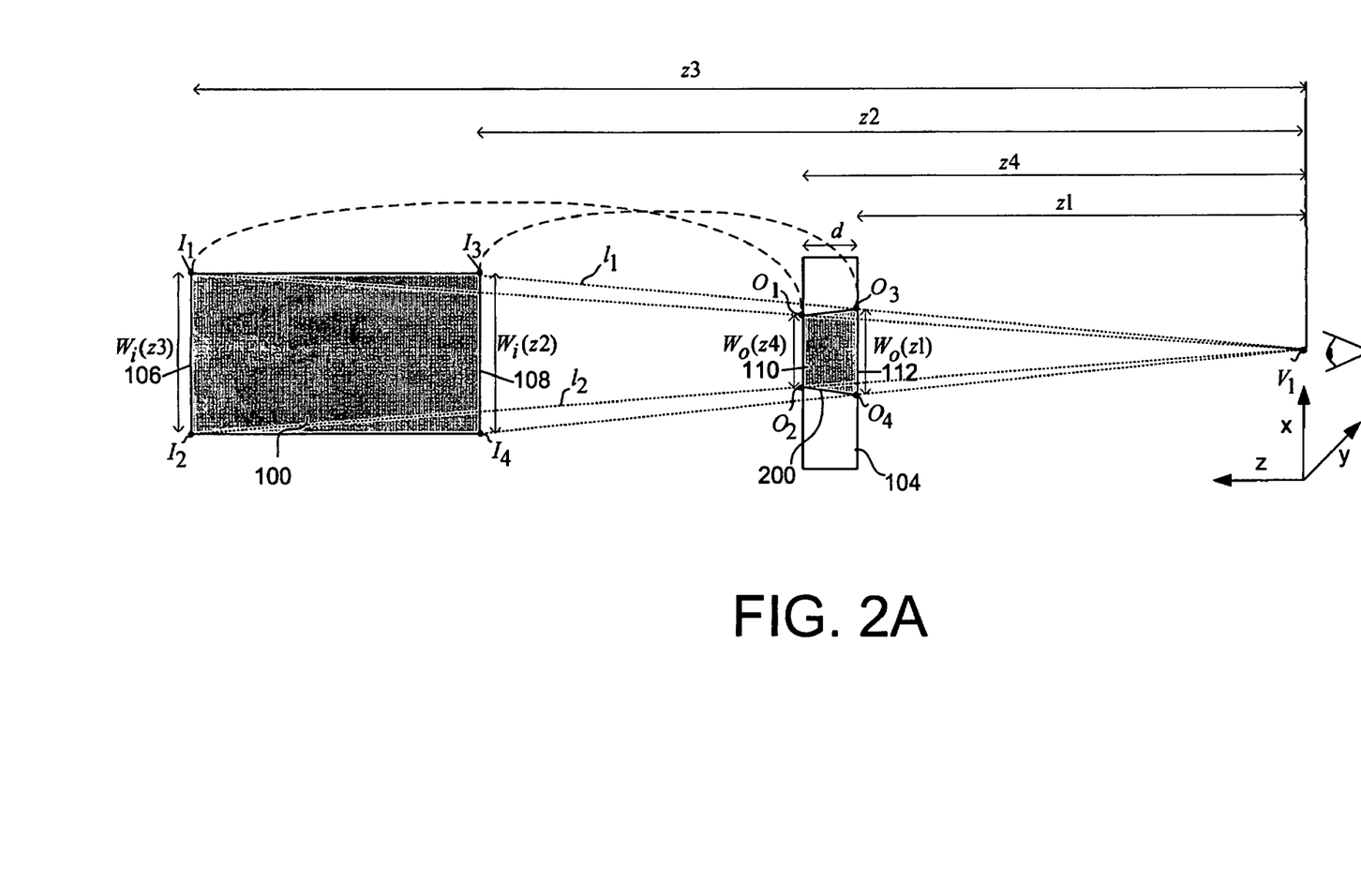
FIG. 2A schematically shows a first embodiment of the method of scaling according to the invention.

FIG. 2A schematically shows the method of scaling according to the invention. FIG. 2A shows a three-dimensional input model 100 and a three-dimensional output model 200 scaled in perspective of a single viewpoint $V_1$. Although the three-dimensional input model 100 has a rectangular shape, the three-dimensional output model 200 has a trapezoid shape. E.g. the first width $W_i(z3)$ of the first side ($z=z3$) of the three-dimensional input model 100 is equal to the second width $W_i(z2)$ of the second side ($z=z2$) of the three-dimensional input model 100 but the first width $W_o(z4)$ of the first side ($z=z4$) of the three-dimensional output model 200 is different from the second width $W_o(z1)$ of the second side of the three-dimensional output model 200. In other words, the change of the first width $W_i(z3)$ and second width $W_i(z2)$ of the three-dimensional input model 100 into the first width $W_o(z4)$ and second width $W_o(z1)$, respectively, depends on the location of the different sides of the three-dimensional input model 100, i.e. the z-coordinates.

The scaling, i.e. transformation of the three-dimensional input model 100 into the predetermined three-dimensional output space 104 is such that each of the output data points $O_1$, $O_2$, $O_3$ and $O_4$ is disposed at or located very close to (depending on the accuracy of computation) respective lines from the respective input data points $I_1$, $I_2$, $I_3$ and $I_4$ to a single viewpoint $V_1$. E.g. a first one $O_3$ of the output data points is located on a first line $l_1$, from the first input data point $I_3$ to the viewpoint $V_1$ and also a second one $O_2$ of the output data points is located on a second line $l_2$ from the second input data point $I_2$ to the particular viewpoint $V_1$.

As said above, the scaling according to the invention is a kind of perspective projection resulting in a deformation of the three-dimensional input model. Below some computations are provided to show the extent of the deformation. The extent of deformation is related to the difference in the change of a first side and the change of a second side.

The first width $W_o(z4) = \|O_2 - O_1\|$ of the first side of the three-dimensional output model 200 in which the output data points $O_1$ and $O_2$ are located, can be computed with Equation 1:

$$W_o(z4) = \frac{W_i(z3)}{z3}(z1 + d), \quad (1)$$

with $W_i(z3) = \|I_2 - I_1\|$ the first width of the first side of the three-dimensional input model 100, in which the input data points $I_1$ and $I_2$ are located, $z1$ the z-coordinate of the border of the predetermined three-dimensional output space 104, $z3$ the z-coordinate of the first surface of the three-dimensional input model 100 and d the depth, i.e. z-range of the predetermined three-dimensional output space 104.

The second width $W_o(z1) = \|O_4 - O_3\|$ of the second side of the three-dimensional output model 200 in which the output data points $O_3$ and $O_4$ are located, can be computed with Equation 2:

$$W_o(z1) = \frac{W_i(z2)}{z2}z1, \quad (2)$$

with $W_i(z2) = \|I_4 - I_3\|$ the second width of the second side of the three-dimensional input model 100 in which the input data points $I_3$ and $I_4$ are located and $z2$ the z-coordinate of the second side of the three-dimensional input model 100.

The difference in size between the two output sides can be computed with Equation 3.

$$D = W_o(z1) - W_o(z4) = \frac{W_i(z2)}{z2}z1 - \frac{W_i(z3)}{z3}(z1 + d) \quad (3)$$

The relative difference between the two output sides corresponds with the difference in scaling factors being applied for the different sides, i.e. surfaces. See Equation 4.

$$D_{rel} = \frac{W_o(z1) - W_o(z4)}{W(z1)} * 100\% \quad (4)$$

In Table 1 some examples are listed. Example 1. Suppose the three-dimensional model 100 corresponds to a scene, e.g. a room of 5 m*5 m*10 m, i.e. $W_i(z2)=5$ m, $W_i(z3)=5$ m and $z3-z2=5$ m. The predetermined three-dimensional output space 104 corresponds to a volumetric display device with a depth range of 10 cm, i.e. $d=0.10$ m. The distance between the viewpoint $V_1$, where the observer 106 is located, and the volumetric display device is equal to 2 m, i.e. $z1=2$ m. Then the first width $W_o(z4)$ of the first side of the scaled three-dimensional output model 200 is equal to 0.7 m and the second width $W_o(z1)$ of the second side of the scaled three-dimensional output model 200 is equal to 1 m. Hence, the difference between the two output sides is equal to 0.3 m and the difference in scaling factors is 30%.

Example 2. Most of the values of Example 1 are applicable. However now the three-dimensional model 100 corresponds to a long corridor of 5 m*20 m. Then the first width $W_o(z4)$ of the first side of the scaled three-dimensional output model 200 is equal to 0.35 m while the second width $W_o(z1)$ of the second side of the scaled three-dimensional output model 200 is still equal to 1 m. Hence, the difference between the two output sides is equal to 0.65 m and the difference in scaling factors is 65%.

Example 3. At $z=z3$ a first actor is located having a width $W_i(z3)$ of 0.5 m and at $z=z2$ a second actor is located having a width $W_i(z2)$ of 0.5 m. The distance between the two actors is 1 m, i.e. $z3-z2=1$. The representation of the first actor is scaled to the first output surface 110 of the scaled three-dimensional output model 200. The width $W_o(z4)$ which is equal to 0.1 m. The representation of the second actor is scaled to the second output surface 112. The width $W_o(z1)$ is equal to 0.095 m. Hence, the difference between the two output sides is equal to 0.005 m and the difference in scaling factors is 5%.

Example 4. Most of the values of Example 3 are applicable. However, now the predetermined three-dimensional output space 104 corresponds to a volumetric display device with a depth range of 5 cm, i.e. $d=0.05$ m. Hence, the difference between the two output sides is equal to 0.007 m and the difference in scaling factors is 7%.

Example 5. Most of the values of Example 3 are applicable. However, now the predetermined three-dimensional output space 104 corresponds to a volumetric display device with a depth range of 5 cm, i.e. $d=0.02$ m. Hence, the difference between the two output sides is equal to 0.008 m and the difference in scaling factors is 8%.

TABLE 1

Examples of scaling.

| Example | $W_i(z2)$ | $W_i(z3)$ | z1 | z2 | z3 | d | $W_o(z1)$ | $W_o(z4)$ | D | $D_{rel}$ [%] |
|---|---|---|---|---|---|---|---|---|---|---|
| 1 | 5 | 5 | 2 | 10 | 15 | 0.10 | 1 | 0.7 | 0.3 | 30 |
| 2 | 5 | 5 | 2 | 10 | 30 | 0.10 | 1 | 0.35 | 0.65 | 65 |
| 3 | 0.5 | 0.5 | 2 | 10 | 11 | 0.10 | 0.100 | 0.095 | 0.005 | 5 |
| 4 | 0.5 | 0.5 | 2 | 10 | 11 | 0.05 | 0.100 | 0.093 | 0.007 | 7 |
| 5 | 0.5 | 0.5 | 2 | 10 | 11 | 0.02 | 0.100 | 0.092 | 0.008 | 8 |

Figure 2B:
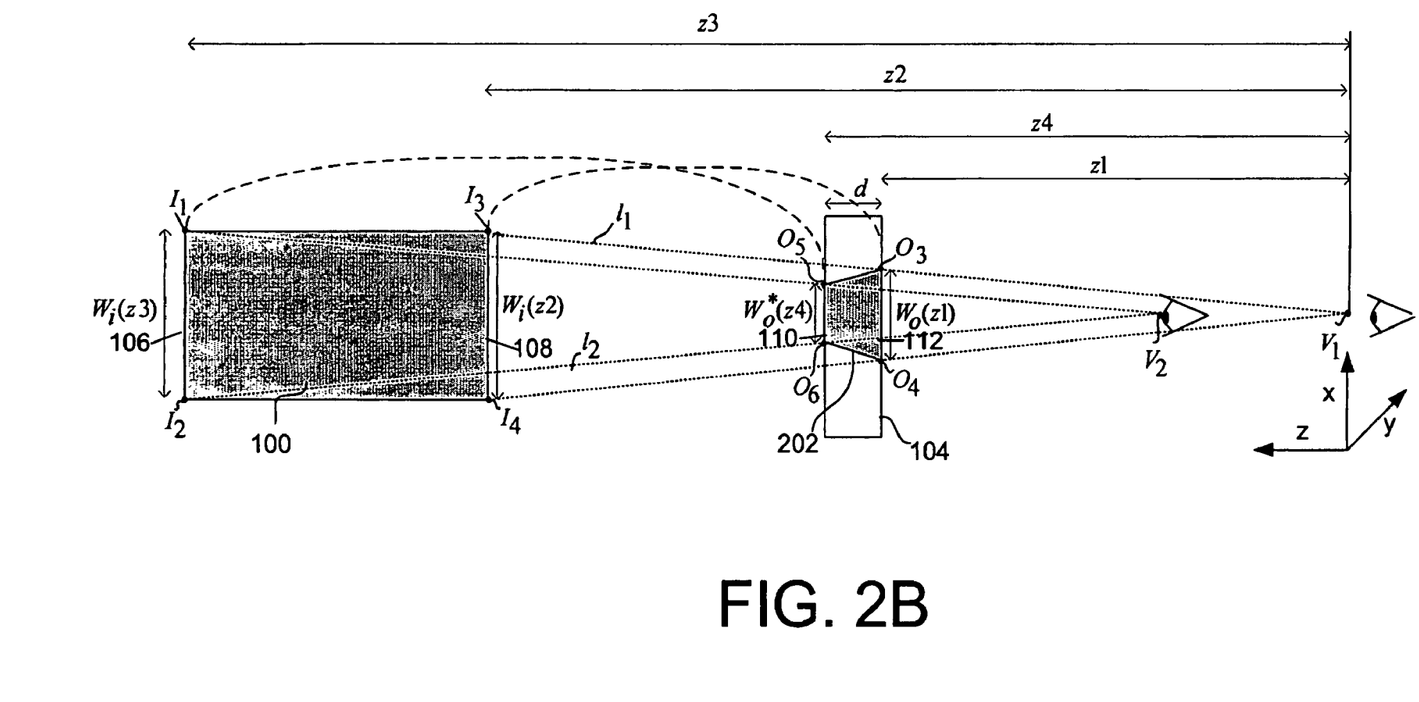
FIG. 2B schematically shows a second embodiment of the method of scaling according to the invention.

FIG. 2B schematically shows a second embodiment of the method of scaling according to the invention. In this embodiment there is not a single viewpoint but there is a range of viewpoints $V_1$, $V_2$. The scaling, i.e. transformation of the three-dimensional input model 100 into the predetermined three-dimensional output space 104 is such that each of the output data points $O_1$, $O_2$, $O_3$ and $O_4$ is disposed at or located very close to (depending on the accuracy of computation) respective lines from the respective input data points $I_1$, $I_2$, $I_3$ and $I_4$ to a range of viewpoints $V_1$, $V_2$. E.g. a first one $O_3$ of the output data points is located on a first line $l_1$, from the first input data point $I_3$ to the viewpoint $V_1$ but a second one $O_2$ of the output data points is located on a second line $l_2$ from the second input data point $I_2$ to the another viewpoint $V_2$. Preferably, each of the input surfaces of the three-dimensional input model is projected into a corresponding output surface of the three-dimensional output model on basis of its own viewpoint. When comparing the three-dimensional output model 202 as depicted in FIG. 2B with the three-dimensional output model 200 as depicted in FIG. 2A, it can be observed that the deformation of the three-dimensional input model 100 is more in the embodiment of the method according to the invention as described in connection with FIG. 2B than in the embodiment of the method according to the invention as described in connection with FIG. 2A. Notice that $W_o^*(z4) < W_o(z4)$. The extent of the additional deformation is related to the amount of enhancement of the depth impression.

It will be clear that instead of enhancement of the depth impression, as described in connection with FIG. 2B also a limited reduction of depth impression can be achieved by applying multiple viewpoints, e.g. one viewpoint behind or above the other. This is not depicted.

Figure 3:
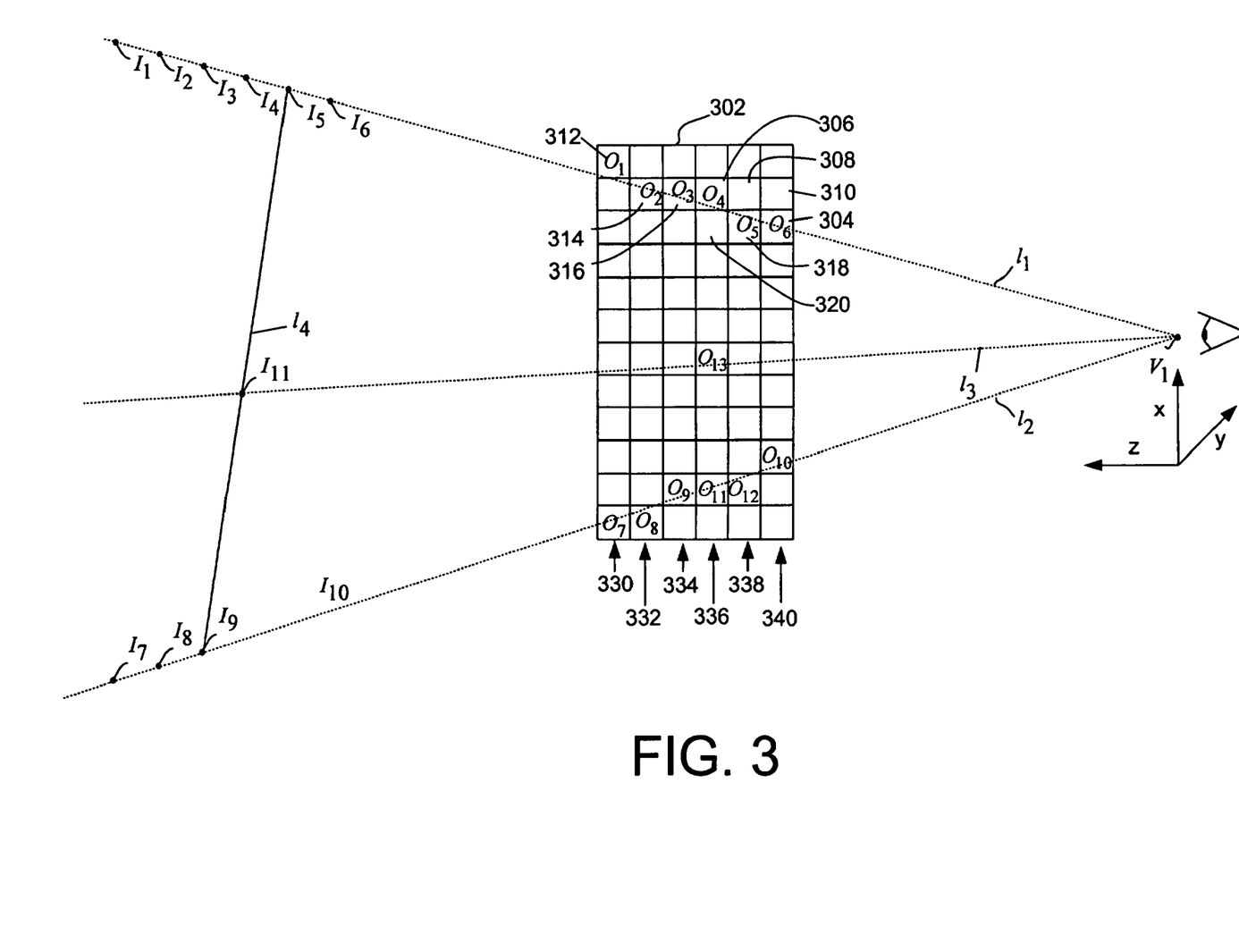
FIG. 3 schematically shows the mapping of input data points into data elements of a memory device.

FIG. 3 schematically shows the mapping of input data points $I_1$-$I_{11}$ into data cells 304-320 of a memory device 302. The memory device 302 comprises a three-dimensional data structure. This three-dimensional data structure represents the predetermined three-dimensional output space. From the three-dimensional data structure only one z, x-slice, i.e. y-coordinate is constant, is depicted in FIG. 3. The different y, x-slices 330-340, i.e. z-coordinate constant, might correspond to the different viewing planes of a volumetric display device. The values, e.g. color and luminance, of the different output data points $O_1$-$O_{13}$ are stored in the respective data cells 304-320 of the memory device 302. For each input data point $I_1$-$I_{11}$ the corresponding data cell is determined and filled with the appropriate color and luminance value. E.g. input data point $I_1$ is mapped into output data point $O_1$ and stored into data cell 312 and input data point $I_6$ is mapped into output data point $O_6$ and stored into data cell 304. The mapping from input data points to output data points is based on the known coordinates of the input data points, the predetermined three-dimensional output space and the viewpoint $V_1$. The x, y and z coordinates of the output data points can be determined with Equation 5, 6 and 7, respectively.

$$O_i(x) = f_x(I_i(x,y,z)) \quad (5)$$

$$O_i(y) = f_y(I_i(x,y,z)) \quad (6)$$

$$O_i(z) = f_z(I_i(x,y,z)) \quad (7)$$

In this case, the z-coordinates of the output data points $O_1$-$O_6$ are computed as follows. It is known, that there are six input data points $I_1$-$I_6$ located on one line $l_1$, through the viewpoint $V_1$. The z-coordinate of the first output surface, which is located at a border of the predetermined three-dimensional output space is known a priori. The z-coordinate of the first output data point $O_1$ on the line $l_1$, is set to this known z-coordinate. The z-coordinate of the second output surface, which is located at the other border of the predetermined three-dimensional output space is known a priori. The z-coordinate of the last output data point $O_6$ on the line $l_1$, is set to this latter z-coordinate. The other z-dividing the z-range of the predetermined three-dimensional output space into five equidistant distances. It should be noted that alternative mappings are possible, see e.g. below. A prerequisite is that the order of input data points is not changed.

Alternatively, the values of output data points $O_7$-$O_{10}$ are computed on basis of distances between input data points $I_7$-$I_{10}$. In this case, the z-coordinates of the output data points $O_7$-$O_{10}$ are computed as follows. It is known, that there are four input data points $I_7$-$I_{10}$ located on one line $l_2$, through the viewpoint $V_1$. The z-coordinate of the first output surface, which is located at a border of the predetermined three-dimensional output space is known a priory. The z-coordinate of the first output data point $O_7$ on the line $l_2$ is set to this known z-coordinate. The z-coordinate of the second output surface, which is located at the other border of the predetermined three-dimensional output space is also known a priori. The z-coordinate of the last output data point $O_{10}$ on the line $l_2$ is set to this latter z-coordinate. The z-coordinates output data points $O_8$ and $O_9$ are computed on basis of distances between input data points $I_7$-$I_{10}$ and the distance between the first output surface and the second output surface. Optionally, further values of output data points $O_{11}$-$O_{12}$ are computed on basis of interpolation of multiple input data points, e.g. $I_7$-$I_{10}$.

In a further alternative, the value of a particular output data point $O_{13}$ is computed on basis of other output data points, e.g. because the corresponding input data point $I_{11}$, belongs to an object in the three-dimensional input model. In FIG. 3 it is depicted that the three input data points $I_5$, $I_9$ and $I_{11}$ are on one line $l_4$, indicating that they belong to one object. The particular input data point $I_{11}$, is located on the line $l_3$ through the viewpoint $V_1$. Because there are no other input data points on the line $l_3$, it is arbitrary in which data cell, i.e. to which z-coordinate the output data point $O_{13}$ is mapped. It might be stored in the data cell of a first y, x-slice 330 corresponding to the first surface of the three-dimensional output model or in a last y, x-slice 340 corresponding to the second surface of the three-dimensional output model. An other option is depicted in FIG. 3. The Z-coordinate of the output data point $O_{13}$ is based on the Z-coordinates of the output data points $O_5$ and $O_9$.

It should be noted that the storage scheme as described above is just an example. Alternatively, the three-dimensional output model is not stored in such a rigid three-dimensional data structure having fixed planes, i.e. y, x-slice 330. An option is to store from each output data point not only a luminance and/or color value but also its coordinates.

Figure 4:
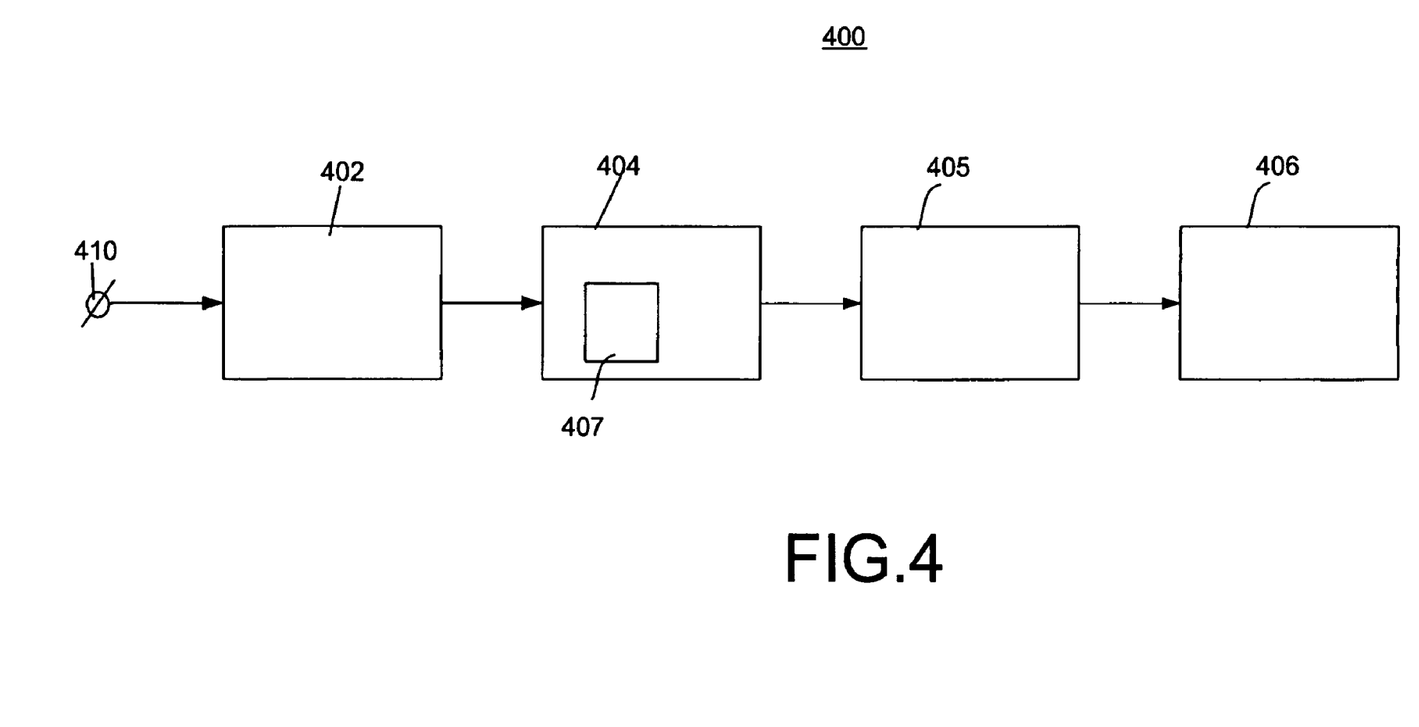
FIG. 4 schematically shows an image processing apparatus according to the invention.

FIG. 4 schematically shows an image processing apparatus 400 according to the invention. The image processing apparatus 400 comprises:

- a receiving unit 402 for receiving a signal representing a three-dimensional input model;
- a scaling unit 404 for scaling the three-dimensional input model into a three-dimensional output model; and
- rendering means 405 for rendering a three-dimensional image on basis of the three-dimensional output model.

The signal is provided at the input connector 410. The signal e.g. is a digital stream of data which is according to the VRML specification. The signal may be a broadcast signal received via an antenna or cable but may also be a signal from a storage device like a VCR (Video Cassette Recorder) or Digital Versatile Disk (DVD).

The scaling unit 404 comprises computing means 407 for computing coordinates of output data points of the three-dimensional output model corresponding to respective input data points of the three-dimensional input model, whereby a first one of the input data points which is located at a first input surface in the three-dimensional input space, having a first distance to a viewpoint, is projected to a first one of the output data points which is located at a first output surface in the predetermined three-dimensional output space by applying a first scaling factor and whereby a second one of the input data points which is located at a second input surface in the three-dimensional input space, having a second distance to the viewpoint, which is smaller than the first distance, is projected to a second one of the output data points which is located at a second output surface in the predetermined three-dimensional space, by applying a second scaling factor which is larger than the first scaling factor. The computation of coordinates of output data points is as described in connection with FIG. 2A, FIG. 2B and FIG. 3.

The computing means 407 of the scaling unit 404 and the rendering means 405 may be implemented using one processor. This is not depicted as such. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

The image processing apparatus optionally comprises a display device 406 for displaying the output images of the rendering means. The image processing apparatus 400 might e.g. be a TV. Alternatively the image processing apparatus 400 does not comprise the optional display device but provides the output images to an apparatus that does comprise a display device 406. Then the image processing apparatus 400 might be a set top box, a satellite-tuner, a VCR player, a DVD player or recorder and the like. Optionally the image processing apparatus 400 comprises storage means, like a hard-disk or means for storage on removable media, e.g. optical disks. The image processing apparatus 400 might also be a system being applied by a film-studio or broadcaster. An other option is that the image processing apparatus 400 is comprised in a game device, for playing games.

It should be noted that the viewpoints which are used to project the input data points to the output data points, do not necessarily have to match with an actual position of an observer. Besides that, the viewpoints which are used to project the input data points to the output data points do not necessarily have to match with another viewpoint which is used to render a three-dimensional image. That means data the different viewpoints should be interpreted as central points for projection. These viewpoints define the geometrical relation between input data points and output data points.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of scaling a three-dimensional input model in a three-dimensional input space into a three-dimensional output model which fits in a predetermined three-dimensional output space, said method comprising the steps of:

projecting, using computing means of a scaling unit, a first input surface in the three-dimensional input space, having a first distance to a viewpoint, to a first output surface in the predetermined three-dimensional output space by applying a first scaling factor; and projecting, using the computing means of the scaling unit, a second input surface in the three-dimensional input space, having a second distance to the viewpoint, which is smaller than the first distance, to a second output surface in the predetermined three-dimensional output space, by applying a second scaling factor which is larger than the first scaling factor.

2. The method as claimed in claim 1, wherein said step of projecting a first input surface comprises:

projecting a first input data point of the three-dimensional input model, being located at the first input surface, to a first output data point of the three-dimensional output model, being located at the first output surface, using a perspective projection relative to the viewpoint.

3. The method as claimed in claim 2, wherein said step of projecting a second input surface comprises:

projecting a second input data point of the three-dimensional input model, being located at the second input surface, to a second output data point of the three-dimensional output model, being located at the second output surface, a perspective projection relative to the viewpoint.

4. The method as claimed in claim 2, wherein said step of projecting a second input surface comprises:

projecting a second input data point of the three-dimensional input model, being located at the second input surface, to a second output data point of the three-dimensional output model, being located at the second output surface, using a perspective projection relative to a further viewpoint.

5. A scaling unit for scaling a three-dimensional input model in a three-dimensional input space into a three-dimensional output model which fits in a predetermined three-dimensional output space, said scaling unit comprising computing means for computing coordinates of output data points of the three-dimensional output model corresponding to respective input data points of the three-dimensional input model, wherein a first one of the input data points which is located at a first input surface in the three-dimensional input space, having a first distance to a viewpoint, is projected to a first one of the output data points which is located at a first output surface in the predetermined three-dimensional output space by applying a first scaling factor, and wherein a second one of the input data points which is located at a second input surface in the three-dimensional input space, having a second distance to the viewpoint, which is smaller than the first distance, is projected to a second one of the output data points which is located at a second output surface in the predetermined three-dimensional space, by applying a second scaling factor which is larger than the first scaling factor.

6. An image processing apparatus comprising:
  receiving means for receiving a signal representing a three-dimensional input model;
  the scaling unit as claimed in claim 5 for scaling the three-dimensional input model into a three-dimensional output model; and
  rendering means for rendering a three-dimensional image on basis of the three-dimensional output model.

7. An image processing apparatus as claimed in claim 6, wherein said image processing apparatus further comprises a display device for displaying the three-dimensional image.

8. A computer-readable medium having stored thereon a computer program to be loaded into a computer arrangement, the computer program comprising instructions for causing the computer arrangement to scale a three-dimensional input model in a three-dimensional input space into a three-dimensional output model which fits in a predetermined three-dimensional output space, the computer arrangement comprising processing means and a memory, the computer program, after being loaded, causing said processing means to compute coordinates of output data points of the three-dimensional output model corresponding to respective input data points of the three-dimensional input model, whereby a first one of the input data points which is located at a first input surface in the three-dimensional input space, having a first distance to a viewpoint, is projected to a first one of the output data points which is located at a first output surface in the predetermined three-dimensional output space by applying a first scaling factor, and whereby a second one of the input data points which is located at a second input surface in the three-dimensional input space, having a second distance to the viewpoint, which is smaller than the first distance, is projected to a second one of the output data points which is located at a second output surface in the predetermined three-dimensional space, by applying a second scaling factor which is larger than the first scaling factor.

* * * * *